US009997826B2

United States Patent
Oey (10) Patent No.: US 9,997,826 B2
(45) Date of Patent: Jun. 12, 2018

(54) TWO-ELEMENT TRAFFIC COLLISION AVOIDANCE SYSTEM (TCAS) ANTENNA

(71) Applicant: Honeywell International Inc., Morristown, NJ (US)

(72) Inventor: David C. Oey, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 248 days.

(21) Appl. No.: 14/711,314

(22) Filed: May 13, 2015

(65) Prior Publication Data

US 2016/0336648 A1 Nov. 17, 2016

(51) Int. Cl.
| | |
|---|---|
| *H01Q 1/28* | (2006.01) |
| *G01S 13/93* | (2006.01) |
| *G01S 7/04* | (2006.01) |
| *G01S 13/78* | (2006.01) |
| *H01Q 1/12* | (2006.01) |

(52) U.S. Cl.
CPC ............ *H01Q 1/28* (2013.01); *G01S 7/04* (2013.01); *G01S 13/781* (2013.01); *G01S 13/9303* (2013.01); *H01Q 1/1207* (2013.01); *H01Q 1/1221* (2013.01)

(58) Field of Classification Search
CPC ............ H01Q 1/28; H01Q 1/286; H01Q 1/12; H01Q 1/20; G01S 7/04; G01S 13/781
USPC ........................................................ 343/705
See application file for complete search history.

(56) References Cited

U.S. PATENT DOCUMENTS

| | | | | |
|---|---|---|---|---|
| 3,478,269 A | * | 11/1969 | Tsao ..................... | H01Q 3/26 333/138 |
| 4,855,748 A | | 8/1989 | Brandao et al. | |
| 4,980,683 A | * | 12/1990 | O'Sullivan ............ | G01S 7/04 340/961 |
| 5,191,349 A | | 3/1993 | Dinsmore et al. | |
| 5,235,336 A | | 8/1993 | Sturm et al. | |
| 5,552,788 A | * | 9/1996 | Ryan ..................... | G01S 3/30 342/30 |
| 5,677,693 A | | 10/1997 | Frankot et al. | |

(Continued)

FOREIGN PATENT DOCUMENTS

| | | |
|---|---|---|
| CN | 204257803 U | 4/2015 |
| EP | 1901087 A1 | 3/2008 |

(Continued)

OTHER PUBLICATIONS

Extended Search Report from counterpart European Application No. 16167365.2, dated Sep. 13, 2016, 7 pp.

(Continued)

*Primary Examiner* — Dieu H Duong
(74) *Attorney, Agent, or Firm* — Shumaker & Sieffert, P.A.

(57) ABSTRACT

Devices and systems are disclosed for a Traffic Collision Avoidance system (TCAS) antenna. In some examples, the TCAS antenna includes two antenna elements, a first plurality of bolt holes, a second plurality of bolt holes, and a third plurality of bolt holes. The first plurality of bolt holes in conjunction with the second plurality of bolt holes enables the TCAS antenna to be mounted to an aircraft in a first orientation. The third plurality of bolt holes in conjunction with the first plurality of bolt holes enable the TCAS antenna to be mounted to the aircraft in a second orientation, and the second orientation is different than the first orientation.

14 Claims, 10 Drawing Sheets

(56) References Cited

U.S. PATENT DOCUMENTS

| | | | |
|---|---|---|---|
| 6,169,519 B1 | 1/2001 | Holecek et al. | |
| 6,223,123 B1* | 4/2001 | Ryan | G01S 3/023 |
| | | | 342/432 |
| 7,385,560 B1 | 6/2008 | Maloratsky et al. | |
| 7,583,223 B2 | 9/2009 | Brandao et al. | |
| 7,978,121 B2 | 7/2011 | Brandao et al. | |
| 2005/0156777 A1 | 7/2005 | King et al. | |
| 2008/0068250 A1* | 3/2008 | Brandao | G01S 3/46 |
| | | | 342/30 |
| 2008/0120032 A1 | 5/2008 | Brandao et al. | |
| 2008/0143602 A1* | 6/2008 | Mak | H01Q 3/24 |
| | | | 342/374 |
| 2008/0191423 A1 | 8/2008 | Cohen | |
| 2008/0204310 A1 | 8/2008 | Blessing et al. | |
| 2008/0284637 A1 | 11/2008 | Blessing et al. | |
| 2010/0117886 A1 | 5/2010 | Brandao et al. | |
| 2011/0221626 A1 | 9/2011 | Hill | |
| 2011/0267216 A1 | 11/2011 | Smith | |
| 2011/0298649 A1* | 12/2011 | Robin | G01S 13/785 |
| | | | 342/30 |
| 2012/0032861 A1* | 2/2012 | Crowley | H01Q 9/30 |
| | | | 343/725 |
| 2012/0326915 A1* | 12/2012 | Hill | G01S 13/9303 |
| | | | 342/30 |
| 2014/0055310 A1* | 2/2014 | Yeshanov | H01Q 1/28 |
| | | | 343/760 |
| 2014/0118181 A1* | 5/2014 | Zeng | G01S 13/9303 |
| | | | 342/30 |
| 2014/0118192 A1* | 5/2014 | Shestak | G01S 3/48 |
| | | | 342/442 |
| 2014/0210669 A1* | 7/2014 | Brandao | G01S 1/04 |
| | | | 342/385 |

FOREIGN PATENT DOCUMENTS

| | | |
|---|---|---|
| EP | 2725383 A2 | 4/2014 |
| WO | 03003519 A1 | 1/2003 |

OTHER PUBLICATIONS

"Traffic Alert and Collision Avoidance System, TCAS-III," Final Engineering Report, U.S. Department of Transportation, Federal Aviation Administration, Apr. 1987, 89 pp.

Response to the Extended European Search Report and Opinion, pursuant to Rule 62 EPC, dated Sep. 13, 2016, from counterpart European Application No. EP 16167365.2, filed on Nov. 18, 2016, 15 pp.

Intention to Grant from counterpart European Application No. 16167365.2, dated Oct. 6, 2017, 41 pp.

* cited by examiner

TWO-ELEMENT TRAFFIC COLLISION AVOIDANCE SYSTEM (TCAS) ANTENNA

TECHNICAL FIELD

This disclosure relates to Traffic Collision Avoidance Systems (TCAS) and, in particular, TCAS antennas.

BACKGROUND

Traffic Collision Avoidance Systems (TCAS) use two antennas, one on the top and one on the bottom of an aircraft to estimate the relative bearing between the aircraft and an intruder (e.g. another aircraft). Each traditional TCAS antenna has four elements, which are placed orthogonally on the same plane. A TCAS system interrogates the transponders of other aircraft. The transponders of other aircraft respond with a reply which may contain altitude or other information. The TCAS system may also use the reply signal to estimate the relative bearing of the other aircraft.

SUMMARY

In general, various examples of this disclosure are directed to devices and systems of a two-element TCAS antenna that may be mounted to traditional aircraft mounting hardware in at least two orientations. The two-element antenna of this disclosure may, for example, be implemented into various aircraft systems, such as one or more TCAS, with each TCAS using a pair of interchangeable two-element TCAS antennas.

In one example, a Traffic Collision Avoidance System (TCAS) antenna that includes two antenna elements, a first plurality of bolt holes, a second plurality of bolt holes, and a third plurality of bolt holes. The first plurality of bolt holes in conjunction with the second plurality of bolt holes enables the TCAS antenna to be mounted to an aircraft in a first orientation. The third plurality of bolt holes in conjunction with the first plurality of bolt holes enable the TCAS antenna to be mounted to the aircraft in a second orientation, and the second orientation is different than the first orientation.

In another example, a TCAS that includes a processing device, a display device, and two TCAS antennas. Each of the two TCAS antennas comprising two antenna elements, a first plurality of bolt holes, a second plurality of bolt holes, and a third plurality of bolt holes. The first plurality of bolt holes in conjunction with the second plurality of bolt holes enables the TCAS antenna to be mounted to the aircraft in a first orientation, and the third plurality of bolt holes in conjunction with the first plurality of bolt holes enable the TCAS antenna to be mounted to the aircraft in a second orientation, and the second orientation is different than the first orientation. A first TCAS antenna of the two TCAS antennas is mounted to the aircraft in the first orientation and a second TCAS antenna of the two TCAS antennas is mounted to the aircraft in the second orientation.

In yet another example, a system comprising a display device on an aircraft, and two or more Traffic Collision Avoidance systems (TCAS). Each TCAS comprising a processing device on the aircraft and two TCAS antennas. Each TCAS antenna comprising two antenna elements, a first plurality of bolt holes, a second plurality of bolt holes, and a third plurality of bolt holes. The first plurality of bolt holes in conjunction with the second plurality of bolt holes enables the TCAS antenna to be mounted to the aircraft in a first orientation, and the third plurality of bolt holes in conjunction with the first plurality of bolt holes enable the TCAS antenna to be mounted to the aircraft in a second orientation, and the second orientation is different than the first orientation. A first TCAS antenna of the two TCAS antennas is mounted to the aircraft in the first orientation and a second TCAS antenna of the two TCAS antennas is mounted to the aircraft in the second orientation.

The details of one or more examples are set forth in the accompanying drawings and the description below. Other features, objects, and advantages will be apparent from the description and drawings, and from the claims.

DETAILED DESCRIPTION

A traditional TCAS antenna includes four elements orthogonal to each other (i.e., spaced 90 degrees apart). Using the TCAS antenna, the TCAS of an aircraft determines bearing information for intruder aircrafts. A TCAS antenna with two elements may also resolve bearing, but unlike a traditional, 4-element TCAS antenna, with a 180 degree of uncertainty. To resolve the bearing issue without the 180 degree of uncertainty, a TCAS may be configured to use two two-element antennas in conjunction with each other, with the antenna elements in a first two-element antenna oriented 90 degrees from the second two-element antenna. In other words, the antenna elements of a first and a second two-element antenna are typically orthogonal to each other. In some examples, the antenna elements of the first antenna may be in a first plane (e.g. on the top of the aircraft) and the antenna elements of the second antenna may be in a second plane (e.g. on the bottom of the aircraft). Additionally, a TCAS configured to use two-element antennas typically does not use traditional four-element TCAS antennas, instead of the two element antennas, because the unused antenna elements of the four-element TCAS antennas may potentially interfere with the reception of the used elements of the four-element TCAS antennas.

Typically, TCAS utilizing multiple two-element antennas requires at least two different types of antennas, with each of the different types having a different bolt-hole configuration in order to achieve the different mounting orientations. Using two different two-element antennas potentially increases manufacturing costs and prevents the two-element antennas from being interchangeable. This lack of interchangeability requires manufacturers to produce more types of antennas and requires customers to stock and manage more types of antennas, which may have different part numbers. For example, when mounted to an aircraft, the two elements of a first type of antenna may be substantially perpendicular to the fuselage of the aircraft, while the two elements of a second type of antenna may be substantially parallel to the fuselage of the aircraft. Additionally, aircraft may have mounting hardware configured for traditional four-element TCAS antennas, which only allows for one fixed orientation of the traditional four-element TCAS antennas. An antenna configured according to the techniques of this disclosure may be mounted to existing aircraft mounting hardware, including aircraft mounting hardware originally installed for four-element antennas, in two or more orientations.

One possible design to address the problems above is to include a rotatable joint that enables the orientation of the two-element TCAS antenna to be changed, but such a rotatable joint potentially increases costs and decreases durability of the two-element antennas. As will be discussed in more detail below, a two-element TCAS antenna of this disclosure may be mountable in multiple orientations without the use of a rotatable joint and while still using existing aircraft mounting hardware.

According to techniques described herein, multiple two-element TCAS antennas may be used to resolve the bearing issue described above. In some examples, the two-element TCAS antennas described herein may be interchangeable, such that the same two-element TCAS antenna can be mounted, using the same mounting base on a plane, in different orientations relative to an aircraft centerline of the fuselage. In these examples, the two-element TCAS antenna may be mountable in first and second orientations, where the difference between the two orientations is an offset of ninety degrees. Thus, in some examples, rather than requiring two different types of antennas to achieve orientations of parallel and perpendicular, utilizing antennas of this disclosure, orientations of parallel and perpendicular can be achieved with two two-element antennas of the same type.

In some examples, each of the multiple two-element TCAS antennas may be mounted to the aircraft in a first orientation, so that an axis defined by the antenna elements is substantially perpendicular to the centerline of the fuselage of an aircraft, or may be mounted to the aircraft in a second orientation, so that an axis defined by the antenna elements is substantially parallel to the fuselage of the aircraft. Each of the multiple two-element TCAS antennas may have a first plurality, second plurality, and third plurality of bolt holes. The first plurality and the second plurality of bolt holes may be used for mounting the two-element TCAS antenna in the first orientation. The first plurality and the third plurality of bolt holes may be used for mounting the two-element TCAS antenna in the second orientation.

The pattern formed by the first plurality and second plurality of bolt holes, as well as the pattern formed by the first plurality and third plurality of bolt holes may both match a standardized pattern such as the pattern defined by the Aeronautical Radio, Incorporated (ARINC 735) family of standards. The ARINC 735 family of standards defines a mounting pattern commonly used for a single mounting orientation for a traditional four-element TCAS antenna. A four-element TCAS antenna typically only needs one mounting orientation because the four elements provide 360° of coverage. In some examples, a two-element TCAS antenna with the bolt-hole configuration as described herein may be mounted in at least two orientations and backwards compatible with existing four-element TCAS antenna mounting hardware. In some examples, the existing four-element TCAS antenna mounting hardware may already be included on current aircraft and may conform to the ARINC 735 family of standards.

In some examples, in a first configuration, a top two-element TCAS antenna may be mounted to the aircraft in the first orientation, while a bottom two-element TCAS antenna may be mounted to aircraft in the second orientation. Conversely, in some examples, in a second configuration, a top two-element TCAS antenna may be mounted to the aircraft in the second orientation, while a bottom two-element TCAS antenna may be mounted to aircraft in the first orientation. As introduced above, a TCAS system utilizing two two-element antennas may use two of the same types of antennas, as opposed to for example, having to use a first type antenna for the top of the plane and a second type of antenna for the bottom of the plane.

Figure 1:
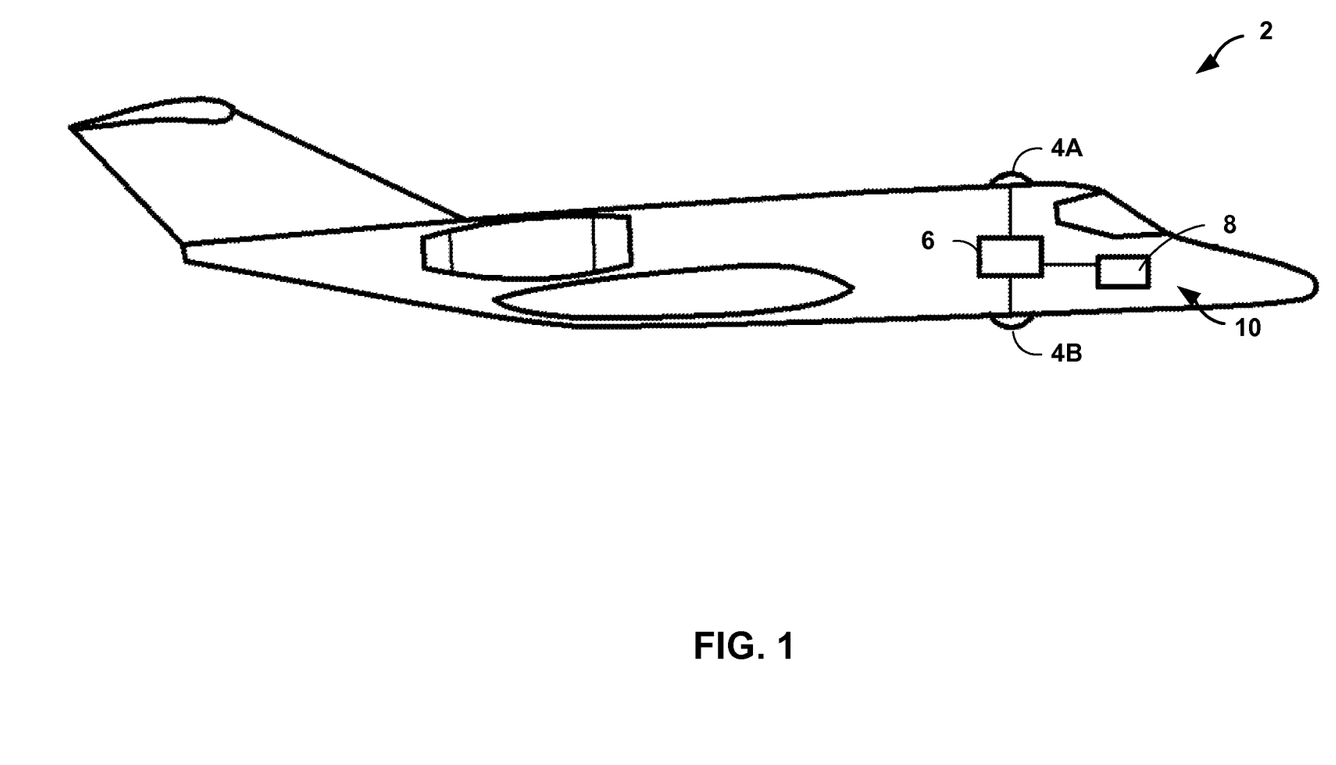
FIG. 1 is a conceptual diagram illustrating an example aircraft having a TCAS that operates with a top two-element TCAS antenna and a bottom two-element TCAS antenna.

FIG. 1 is a conceptual diagram illustrating example aircraft 2 having TCAS 10 that operates with top two-element TCAS antenna 4A and bottom two-element TCAS antenna 4B. TCAS 10 includes two-element TCAS antennas 4A and 4B, processing device 6, and graphical user interface/display device 8 ("display device 8"). TCAS 10 operates with two-element TCAS antenna 4A mounted to the top of the aircraft 2 and two-element TCAS antenna 4B mounted to the bottom of aircraft 2. In the example of FIG. 1, TCAS 10 includes processing device 6, which may include one or more processor(s), memory, and data storage. In the example of FIG. 1, processing device 6 is shown separately from display device 8 in FIG. 1, although in other examples, processing device 6 and display device 8 may be highly integrated. In the example of FIG. 1, two-element TCAS antenna 4A and two-element TCAS antenna 4B are communicatively coupled to processing device 6.

Two-element TCAS antennas 4A and 4B each have two antenna elements connected along an axis. In some examples, two-element TCAS antennas 4A and 4B may be the same type of antenna (e.g. same model or part number) oriented in two different orientations. In these examples, two-element TCAS antennas 4A and 4B may also be interchangeable with each other. In other examples, two-element TCAS antennas 4A and 4B may not be the same type but may still be interchangeable, meaning that two-element TCAS antenna 4A could be mounted to the bottom of aircraft 2 in place of two-element TCAS antenna 4B.

In some examples, two-element TCAS antenna 4A may be mounted to aircraft 2 in a first orientation relative to a centerline of aircraft 2, and two-element TCAS antenna 4B may be mounted to aircraft 2 in a second orientation relative to a centerline of aircraft 2. In some examples, two-element TCAS antenna 4B may be mounted in the first orientation relative to a centerline of aircraft 2 and two-element TCAS antenna 4A may be mounted in the second orientation relative to a centerline of aircraft 2. In some examples, the centerline of aircraft 2 is an axis along the geometric center of aircraft 2. As described herein, the first orientation may be one of perpendicular or parallel to the axis of the centerline, while the second orientation may be the other one of perpendicular or parallel to the axis of the centerline. While it is contemplated that the techniques of this disclosure may be implemented with orientations other than just parallel and perpendicular, for ease of explanation, this disclosure will generally use parallel and perpendicular as example orientations when describing the techniques of this disclosure.

In some examples, two-element TCAS antenna 4A may be mounted to aircraft 2 in a first orientation relative to an axis other than the centerline of aircraft 2, and two-element TCAS antenna 4B may be mounted to aircraft 2 in a second orientation relative to the axis other than the centerline of aircraft 2. In some examples, two-element TCAS antenna 4B may be mounted in a first orientation relative to an axis other than the centerline of aircraft 2, and two-element TCAS antenna 4A may be mounted in a second orientation relative to an axis other than the centerline of aircraft 2.

In the example of FIG. 1, two-element TCAS antenna 4A is attached (e.g., mounted) to the top of aircraft 2 and two-element TCAS antenna 4B is attached to the bottom of aircraft 2. According to the techniques of this disclosure, two-element TCAS antenna 4B and two-element TCAS antenna 4A each may have a bolt-hole configuration that enables each antenna to be mounted in at least two different orientations. In some examples, the bolt-hole configuration of each antenna may also enable two-element TCAS antennas 4A and 4B to be interchangeable with each other. For example, two-element TCAS antenna 4B may be rotated by 90 degrees and attached to the top of aircraft 2, and two-element TCAS antenna 4A may be rotated by 90 degrees and attached to the bottom of aircraft 2.

Processing device 6 includes one or more processors and each of the one or more processors can comprise any suitable arrangement of hardware, software, firmware, or any combination thereof, to perform the techniques attributed to the respective processing device 6. For example, the one or more processors of processing device 6 may each include any one or more microprocessors, digital signal processors (DSPs), application specific integrated circuits (ASICs), field programmable gate arrays (FPGAs), or any other equivalent integrated or discrete logic circuitry, as well as any combinations of such components. The data storage of processing device 6 may include one or more hard disk drives, one or more flash drives, and/or one or more additional non-volatile or more or less long-term data storage devices. The memory of processing device 6 may include random access memory (RAM) integrated circuits, cache circuits, and/or one or more volatile or more or less short-term data storage devices. The data storage and/or memory of processing device 6 may also include one or more devices or systems that may function or be used as either long-term data storage and/or short-term memory.

Display device 8 may generate and display graphical displays of maps of flight paths of an aircraft, along with meteorological conditions in the range of a flight path. In other examples, display device 8 may be provided by a primary flight display (PFD), a multifunction display (MFD), a navigation display, or any other suitable display.

In some examples, processing device 6 may perform a process (e.g., a switching algorithm) that uses antenna pattern and received signal strength to calculate the bearing angle. First, a TCAS broadcast is received at two-element TCAS antennas 4A and 4B. Next, processing device 6 receives signals from the two elements of two-element TCAS antennas 4A and 4B, then processing device 6 measures phase and amplitude of the signal from each element. Then, processing device 6 estimates signal-to-noise ratio (SNR) from the signal received from each element. In some examples, processing device 6 may also estimate signal level, signal phase variance, elevation angle, etc. from the signal received from each element. In some examples, the SNRs from the two elements of two-element TCAS antenna 4A may be similar and the SNRs from the two antenna elements of two-element TCAS antenna 4B may also be similar. In these examples, processing device 6 may be configured to assume that the signal from the two antenna elements of two-element TCAS antenna 4A have the same SNR, and the signal from the two antenna elements of two-element TCAS antenna 4B have the same SNR.

In some examples, processing device 6 may then determine if the SNR associated with two-element TCAS antenna 4A may be greater than or equal to the SNR associated with two-element TCAS antenna 4B. If the SNR associated with two-element TCAS antenna 4A is greater than the SNR associated with two-element TCAS antenna 4B, then processing device 6 may determine a critical angle, a quadrant difference of the critical angle, and a first bearing angle, based on the SNRs, phase variance, and/or phase measurements. Processing device 6 may then determine if the first bearing angle is within a first set of bearing ranges based on the quadrant difference of the critical angle. If processing device 6 determines that the first bearing angle is within the first set of bearing ranges, processing device 6 may output the first bearing angle to display device 8. If processing device 6 determines that the first bearing angle is not within the first set of bearing range, processing device 6 may determine a second bearing angle, and then processing device 6 may then output the second bearing angle to display device 8.

In some examples, if processing device 6 determines that the SNR associated two-element TCAS antenna 4A may be less than the SNR associated with two-element TCAS antenna 4B, then processing device 6 may determine a critical angle, a quadrant difference of the critical angle, and a first bearing angle, based on the SNRs, phase variance, and/or phase measurements. Processing device 6 may then determine if the first bearing angle is within a second set of bearing ranges based on the quadrant difference of the critical angle. If processing device 6 determines that the first bearing angle is within the second set of bearing ranges, processing device 6 may output the first bearing angle to display device 8. If processing device 6 determines that the first bearing angle is not within the second set of bearing ranges, processing device 6 may determine a third bearing angle based on the SNRs and phase measurements, and processing device 6 may output the third bearing angle to display device 8.

Figure 2A:
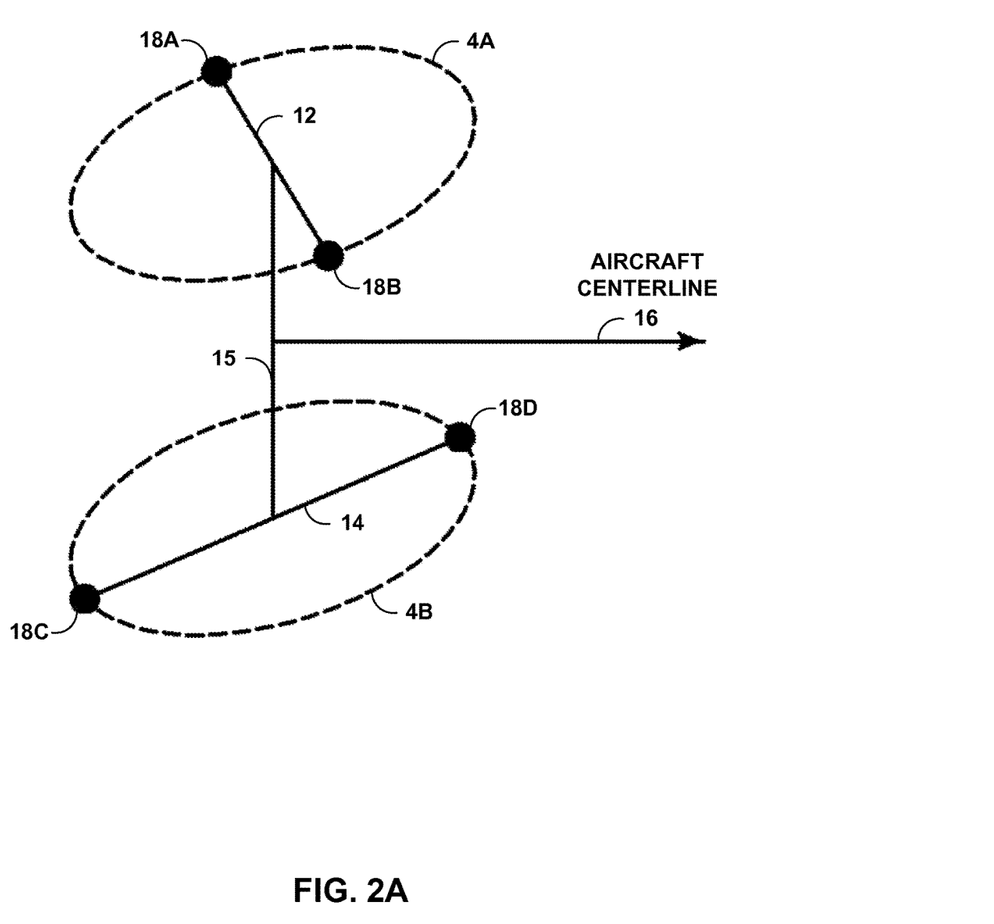
FIGS. 2A and 2B are conceptual diagrams each illustrating examples of two, two-element TCAS antennas on an aircraft in a first or a second orientation relative to an aircraft centerline.
Figure 2B:
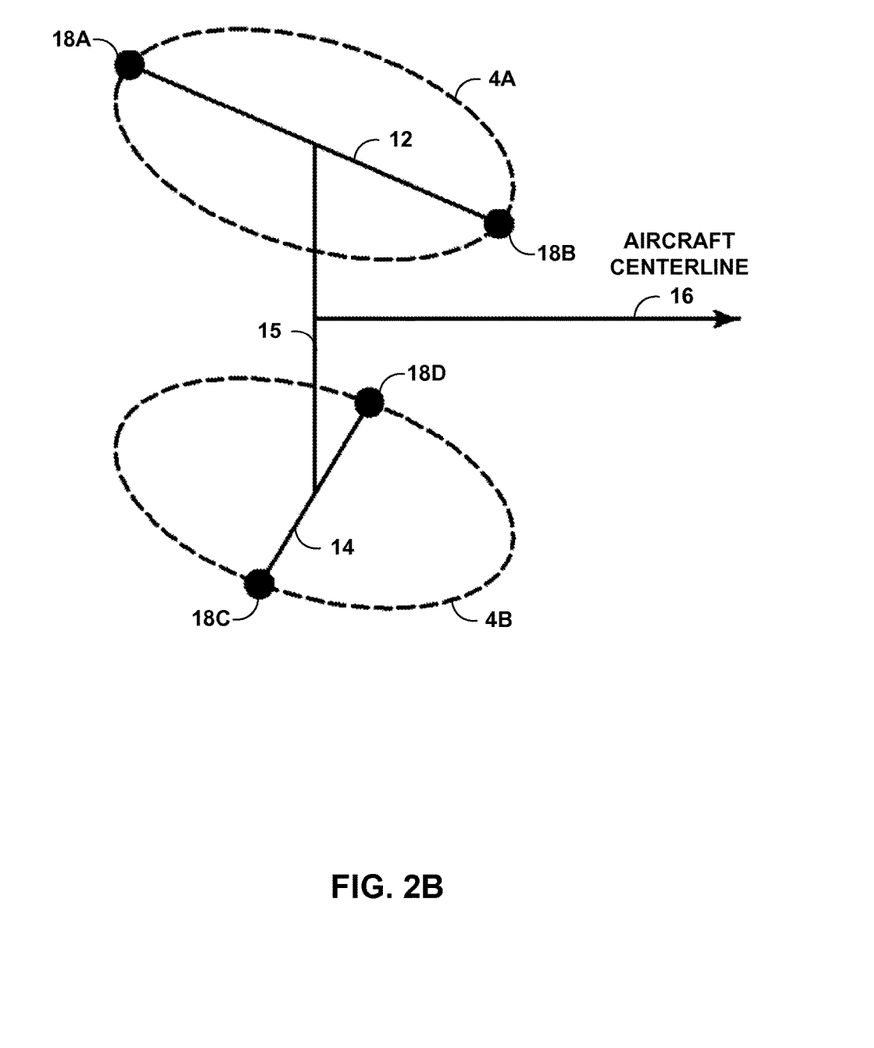

FIGS. 2A and 2B are conceptual diagrams each illustrating examples of two, two-element TCAS antennas 4A and 4B in a first or a second orientation relative to aircraft centerline 16. In the example of FIG. 2A, two-element TCAS antenna 4A includes first antenna element 18A and second antenna element 18B along axis 12 in a first orientation. In this example, first and second antenna elements 18A and 18B may be substantially perpendicular relative to aircraft centerline 16 (e.g., within one degree of perpendicular of aircraft centerline 16) of aircraft 2 as described in FIG. 1. In the example of FIG. 2A, two-element TCAS antenna 4B includes third antenna element 18C and fourth antenna element 18D along axis 14 in a second orientation. In this example, third and fourth antenna elements 18C and 18D may be substantially parallel (e.g., within one degree of parallel of aircraft centerline 16) relative to aircraft centerline 16 of aircraft 2 as described in FIG. 1.

In the example of FIG. 2A, first and second antenna elements 18A and 18B and third and fourth antenna elements 18C and 18D (collectively "antenna elements 18") are orthogonal to each other. For example, antenna elements 18 are orthogonal to each other, where first and second antenna elements 18A and 18B are in a first plane at the top of aircraft 2 and third and fourth antenna elements 18C and 18D are in a second plane at the bottom of aircraft 2. In this way, the first orientation of two-element TCAS antenna 4A is orthogonal to the second orientation of two-element TCAS antenna 4B. For example, in FIG. 2A, axis 12 is perpendicular to axis 14, and antenna elements 18A and 18B are rotated by approximately 90 degrees relative to antenna elements 18C and 18D.

In the example of FIG. 2B, two-element TCAS antenna 4A includes first antenna element 18A and second antenna element 18B along axis 12 in a second orientation. In this example, first and second antenna elements 18A and 18B may be substantially parallel relative to aircraft centerline 16 of aircraft 2 as described in FIG. 1. In the example of FIG. 2A, two-element TCAS antenna 4B includes third antenna element 18C and fourth antenna element 18D along axis 14 in a first orientation. In this example, third and fourth antenna elements 18C and 18D may be substantially perpendicular relative to aircraft centerline 16 of aircraft 2 as described in FIG. 1.

FIG. 2B illustrates two-element TCAS antenna 4A in a second orientation (e.g., parallel) and two-element TCAS antenna 4B in a first orientation (e.g., perpendicular). For example, whereas antenna elements 18A and 18B of antenna 4A are perpendicular relative to aircraft centerline 16 in FIG. 2A, in FIG. 2B, antenna elements 18A and 18B of antenna 4A are parallel relative to aircraft centerline 16. Similarly, whereas antenna elements 18C and 18D of antenna 4B are parallel relative to aircraft centerline 16 in FIG. 2A, in FIG. 2B, antenna elements 18C and 18D of antenna 4B are perpendicular relative to aircraft centerline 16.

In some examples, vertical axis 15 between axis 12 and axis 14 may be along a geometric center of aircraft 2. In other examples, vertical axis 15 between axis 12 and axis 14 may not be along the geometric center of aircraft 2. In some examples, vertical axis 15 may be a diagonal axis. In these examples, two-element TCAS antenna 4A may be farther forward or farther back along the length of aircraft 2 than two-element TCAS antenna 4B. Similarly, two-element TCAS antenna 4B may be farther forward or farther back along the length of aircraft 2 than two-element TCAS antenna 4A.

Figure 3A:
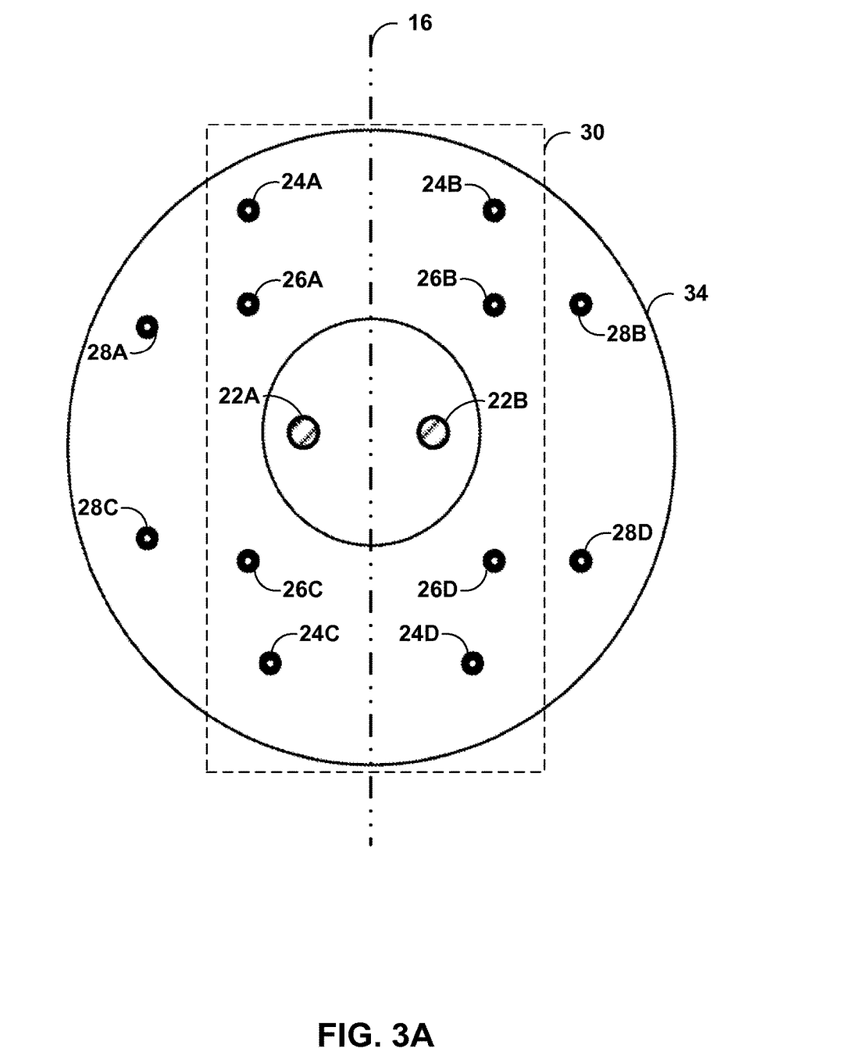
FIGS. 3A and 3B are conceptual diagrams illustrating an example two-element TCAS antenna which has a bolt-hole configuration formed by bolt holes.
Figure 3B:
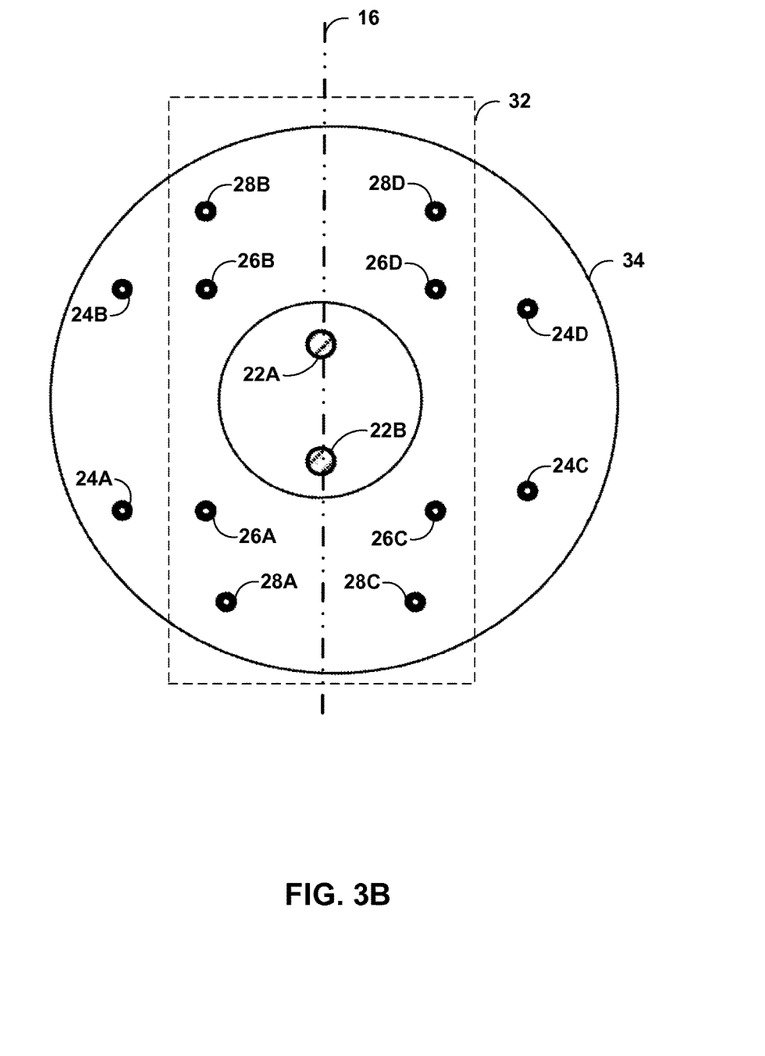

FIGS. 3A and 3B are conceptual diagrams illustrating example two-element TCAS antenna 34 which has a bolt-hole configuration formed by bolt holes 24A-24D, 26A-26D, and 28A-28D. FIGS. 3A and 3B show an example aircraft centerline 16, which may, for example, represent the longer dimension (e.g. the front to back dimension) of an aircraft fuselage. As will be explained in greater detail below, the bolt-hole configuration of TCAS antenna 34 may enable TCAS antenna 34 to be mounted to an aircraft in either of a first orientation or a second orientation relative to aircraft centerline 16. Additionally, the bolt-hole configuration may prevent TCAS antenna 34 from being mounted in orientations other than the first orientation or the second orientation.

Two-element TCAS antenna 34 may correspond to either or both of two-element TCAS antennas 4A and 4B as described in FIGS. 1-2B. Two-element TCAS antenna 34 includes antenna elements 22A and 22B (collectively "antenna elements 22") that may correspond to first and second antenna elements 18A and 18B and/or third and fourth antenna elements 18C and 18D as described in FIGS. 2A and 2B. Two-element TCAS antenna 34 further includes a bolt-hole configuration, which includes a first plurality of bolt holes 24A-24D (collectively "first bolt holes 24"), a second plurality of bolt holes 26A-26D (collectively "second bolt holes 26"), and a third plurality of bolt holes 28A-28D (collectively "third bolt holes 28").

Bolt holes 24A and 24B may be separated by a distance substantially similar to the distance that separates bolt holes 28B and 28D, and bolt holes 24C and 24D may be separated by a distance substantially similar to the distance that separates bolt holes 28A and 28C. Bolt holes 28B and 26B may be separated by a distance substantially similar to the distance that separates bolt holes 24A and 26A, and bolt holes 28A and 26A may be separated by a distance substantially similar to the distance that separates bolt holes 24C and 26C. In this way, first bolt holes 24 and second bolt holes 26 form a first pattern for mounting two-element TCAS antenna 34 in a first orientation (e.g., perpendicular relative to aircraft centerline 16), and second bolt holes 26 and third bolt holes 28 form a second pattern for mounting two-element TCAS antenna 34 in a second orientation (e.g., parallel relative to aircraft centerline 16), such that the first and second patterns are offset 90 degrees from each other. Second bolt holes 26 are used to attach two-element TCAS antenna 34 in both the first and the second orientation of two-element TCAS antenna 34, whereas first bolt holes 24 are only used for the first orientation and third bolt holes 28 are only used for the second orientation.

In the example of FIG. 3A, section 30 identifies first bolt holes 24 and second bolt holes 26 which may be used when attaching two-element TCAS antenna 34 in a first orientation. In other words, first bolt holes 24 and second bolt holes 26 of section 30 are used to attach two-element TCAS antenna 34 in a first orientation, so that an axis defined by antenna elements 22 is substantially perpendicular relative to aircraft center line 16. First bolt holes 24 and second bolt holes 26 of section 30 may form a pattern that matches a standardized pattern, such as the pattern specified in the ARINC 735 family of standards. When attaching TCAS antenna 34 in the first orientation, third bolt holes 28 of the bolt-hole configuration may not correspond to the standardized pattern and may not be used.

In some examples, the pattern formed by first bolt holes 24 and second bolt holes 26 may not be symmetrical, such that two-element TCAS antenna 34 may only be attached to the aircraft in the first orientation. In other words, although the pattern is symmetrical along a longitudinal axis (e.g., aircraft centerline 16), the pattern is asymmetrical along a latitudinal axis (e.g., an axis perpendicular to aircraft centerline 16), which allows two-element TCAS antenna 34 to only be attached in the first orientation and not in an orientation 180 degrees offset from the first orientation.

In the example of FIG. 3B, the bolt holes of section 32 (i.e., second bolt holes 26 and third bolt holes 28) are used when attaching two-element TCAS antenna 34 in a second orientation. The second orientation may, for example, be offset by 90 degrees from the first orientation described with respect to FIG. 3A. In other words, second bolt holes 26 and third bolt holes 28 of section 32 are used to attach two-element TCAS antenna 34, so that an axis defined by antenna elements 22 is substantially parallel relative to aircraft center line 16. Second bolt holes 26 and third bolt holes 28 of section 32 may form a pattern, which may match a standardized pattern such as the pattern specified in the ARINC 735 family of standards. In the second orientation, first bolt holes 24 of the bolt-hole configuration may not correspond to the pattern and may not be used for mounting TCAS antenna 34 in the second orientation.

In some examples, the pattern formed by second bolt holes 26 and third bolt holes 28 may not be symmetrical, such that two-element TCAS antenna 34 may only be attached to the aircraft in the second orientation. In other words, although the pattern is symmetrical along a longitudinal axis (e.g., aircraft centerline 16), the pattern is asymmetrical along a latitudinal axis (e.g., an axis perpendicular to aircraft centerline 16), which allows two-element TCAS antenna 34 to only be attached in the second orientation and not in an orientation 180 degrees offset from the second orientation.

In some examples, two-element TCAS antenna 34 may have two asymmetrical patterns to enable two-element TCAS antenna 34 to be attached to an aircraft in either a first orientation or a second orientation. In some examples, the two asymmetrical patterns may further prevent two-element TCAS antenna 34 from being attached to aircraft 2 in orientations other than the first orientation or the second orientation.

In some examples, a TCAS antenna (e.g., two-element TCAS antenna 4A. 4B, or 34) may include two antenna elements (e.g., antenna elements 18A and 18B, 18C and 18D, or 22A and 22B), a first plurality of bolt holes (e.g., bolt holes 24A-24D), a second plurality of bolt holes (e.g., bolt holes 26A-26D), and a third plurality of bolt holes (e.g., bolt holes 28A-28D). In these examples, the first plurality of bolt holes in conjunction with the second plurality of bolt holes may enable the TCAS antenna to be mounted to an aircraft in a first orientation. In these examples, the third plurality of bolt holes in conjunction with the first plurality of bolt holes may enable the TCAS antenna to be mounted to the aircraft in a second orientation, where the second orientation is different than the first orientation.

In some examples, the first plurality and the second plurality of bolt holes may form a first pattern (e.g., a pattern within section 30). In these examples, the first pattern may match a pattern of an ARINC 735 standard. In some examples, an axis defined by the two antenna elements may be perpendicular to a longitudinal axis (e.g., aircraft centerline 16) of the first pattern.

In some examples, the second plurality and the third plurality of bolt holes form a second pattern (e.g., a pattern within section 32). In these examples, the second pattern may match a pattern of an ARINC 735 standard. In these examples, the second pattern may be offset by 90 degrees from a first pattern formed by the first plurality and the second plurality of bolt holes. In these examples, the first and second patterns each comprise an asymmetrical pattern, and wherein the asymmetrical pattern of the first and second patterns enable the TCAS antenna to be mounted in only one of the first orientation or the second orientation. In some examples, an axis defined by the two antenna elements may be parallel to a longitudinal axis (e.g., aircraft centerline 16) of the second pattern.

In some examples, a TCAS may include a processing device (e.g., processing device 6) on an aircraft (e.g., aircraft 2), a display device (e.g., display device 8) on the aircraft, and two TCAS antennas (e.g., TCAS antennas 4A and 4B, or 34). In these examples, each TCAS antenna may include two antenna elements (e.g., antenna elements 18A and 18B, 18C and 18D, or 22A and 22B), a first plurality of bolt holes (e.g., bolt holes 24A-24D), a second plurality of bolt holes (e.g., bolt holes 26A-26D), and a third plurality of bolt holes (e.g., bolt holes 28A-28D). In these examples, the first plurality of bolt holes in conjunction with the second plurality of bolt holes may enable the TCAS antenna to be mounted to the aircraft in a first orientation. In these examples, the third plurality of bolt holes in conjunction with the first plurality of bolt holes may enable the TCAS antenna to be mounted to the aircraft in a second orientation, where the second orientation is different than the first orientation. In these examples, a first TCAS antenna of the two TCAS antennas is mounted to the aircraft in the first orientation and a second TCAS antenna of the two TCAS antennas is mounted to the aircraft in the second orientation.

In some examples, a first TCAS antenna of the two TCAS antennas may be interchangeable with a second TCAS antenna of the two TCAS antennas. In some examples, each of the two TCAS antennas may be configured to be mounted to one of a top of the aircraft or a bottom of the aircraft. In some examples, the first TCAS antenna of the two TCAS antennas is mounted to the aircraft in the first orientation, and the second TCAS antenna of the two TCAS antennas is mounted to the aircraft in the second orientation. In these examples, the first TCAS antenna may be mounted to the top of the aircraft and offset by 90 degrees from the second TCAS antenna mounted to the bottom of the aircraft.

In some examples, the first plurality and the second plurality of bolt holes may form a first pattern. In these examples, the first pattern may match a pattern of an ARINC 735 standard. In these examples, an axis defined by the two antenna elements may be perpendicular to a longitudinal axis of the first pattern.

In some examples, the second plurality and the third plurality of bolt holes may form a second pattern. In these examples, the second pattern may match a pattern of an ARINC 735 standard. In some examples, an axis defined by the two antenna elements may be parallel to a longitudinal axis of the second pattern. In some examples, the second pattern may be offset by 90 degrees from a first pattern formed by the first plurality and the second plurality of bolt holes.

Figure 4:
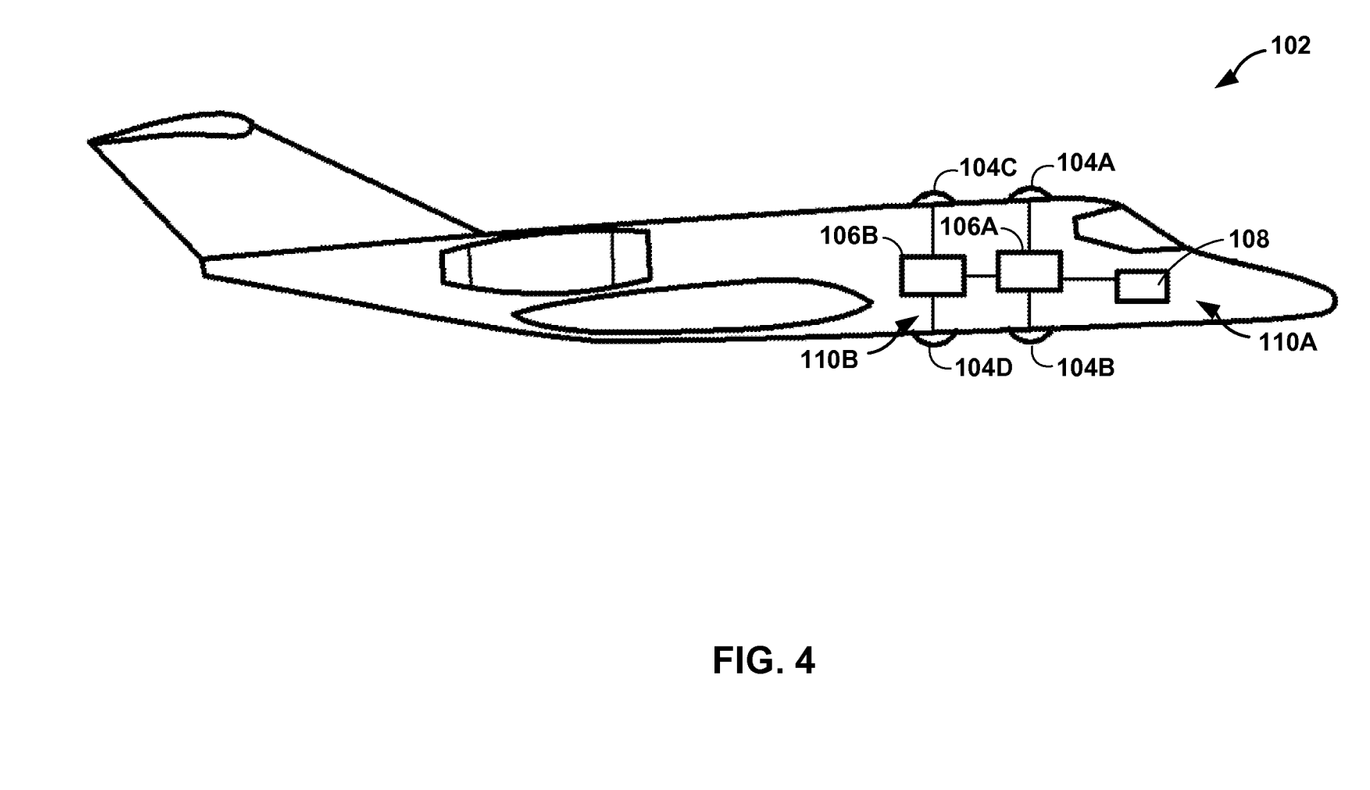
FIG. 4 is a conceptual diagram illustrating another example aircraft having two TCASs.

FIG. 4 is a conceptual diagram illustrating another example aircraft 102 having two TCASs 110A and 110B. In the example of FIG. 4, aircraft 102 includes two-element TCAS antennas 104A-104D (collectively "two-element TCAS antennas 104"), processing devices 106A and 106B (collectively "processing devices 106"), and display device 108, which may correspond to two-element TCAS antennas 4A and 4B, processing device 6, and display 8 as described in FIG. 1 with respect to aircraft 2.

In the example of FIG. 4, two-element TCAS antennas 104 may be the same type of antennas (e.g., same model or part number) oriented in different orientations. In some examples, two-element TCAS antennas 104 may be interchangeable with each other, meaning that two-element TCAS antennas 104 may be used in any combination as long as at least two antennas of two-element TCAS antennas 104 have orientations that are orthogonal to each other. In other examples, two-element TCAS antennas 104 may not be the same type but may still be interchangeable. Two-element TCAS antennas 104A and 104C may be oriented in first and second orientations, respectively, with the first and second orientations being offset by approximately 90 degrees. Two-element TCAS antennas 104B and 104D may similarly be oriented in third and fourth orientations, respectively, with the third and fourth orientations being offset by approximately 90 degrees. While it is contemplated that the third and fourth orientations of two-element TCAS antennas 104B and 104D may typically be the same, or approximately the same, as the first and second orientations of two-element TCAS antennas 104A and 104C, it is also contemplated that the third and fourth orientations may be different than the first and second orientations. As one example, the first and second orientations may be, respectively, parallel and perpendicular relative to the centerline of aircraft 102, while the third and fourth orientations may also be, respectively, parallel and perpendicular relative to the centerline of aircraft 102. As another example, the first and second orientations may be, respectively, parallel and perpendicular relative to the centerline of aircraft 102, while the third and fourth orientations may be, respectively, 45 degrees and 135 degrees offset relative to the centerline of aircraft 102.

In the example of FIG. 4, two-element TCAS antenna 104A and 104C are attached (e.g., mounted) to the top of aircraft 102 and two-element TCAS antenna 104B and 104D are attached to the bottom of aircraft 102. According to the techniques of this disclosure, each antenna of two-element TCAS antennas 104 may have a bolt-hole configuration that enables each antenna to be mounted in at least two different orientations. In some examples, the bolt-hole configuration of each antenna of two-element TCAS antennas 104 may also enable the antennas of two-element TCAS antennas 104 to be interchangeable with each other. For example, any one of two-element TCAS antennas 104 may be rotated by 90 degrees and attached to the top of aircraft 102, and another one of two-element TCAS antennas 104 may be rotated by 90 degrees and attached to the bottom of aircraft 102, such that there are at least a pair of two-element TCAS antennas from two-element TCAS antennas 104 that are orthogonal to each other.

It is contemplated that TCAS 110A and 110B may operate with any combination of two-element TCAS antennas 104 via the connection (e.g., a communication channel) between TCAS 110A and 110B. In other words, as long as at least a first and a second two-element TCAS antenna of two-element TCAS antennas 104 are orthogonal to each other, then TCAS 110A and/or 110B may perform the processing functions as described in FIG. 1. In this example, any antenna of two-element TCAS antennas 104 may be in a first orientation, then any of the other antennas of two-element TCAS antennas 104 may be used in a second orientation. Similarly, any antenna of two-element TCAS antennas 104 may be in a third orientation, then any of the other antennas of two-element TCAS antennas 104 may be used in a fourth orientation.

FIGS. 5A-5D are conceptual diagrams each illustrating examples of two, two-element TCAS antennas on aircraft 102 in different orientations relative to aircraft centerline 116. In the examples of FIGS. 5A-5D, aircraft 102 includes two, two-element TCAS antennas 104A and 104C or 104B and 104D (collectively "two-element TCAS antennas 104") oriented along aircraft centerline 116. Aircraft centerline 116 may correspond to aircraft centerline 16 as described in FIGS. 2A-3B.

Figures 5A, 5B:
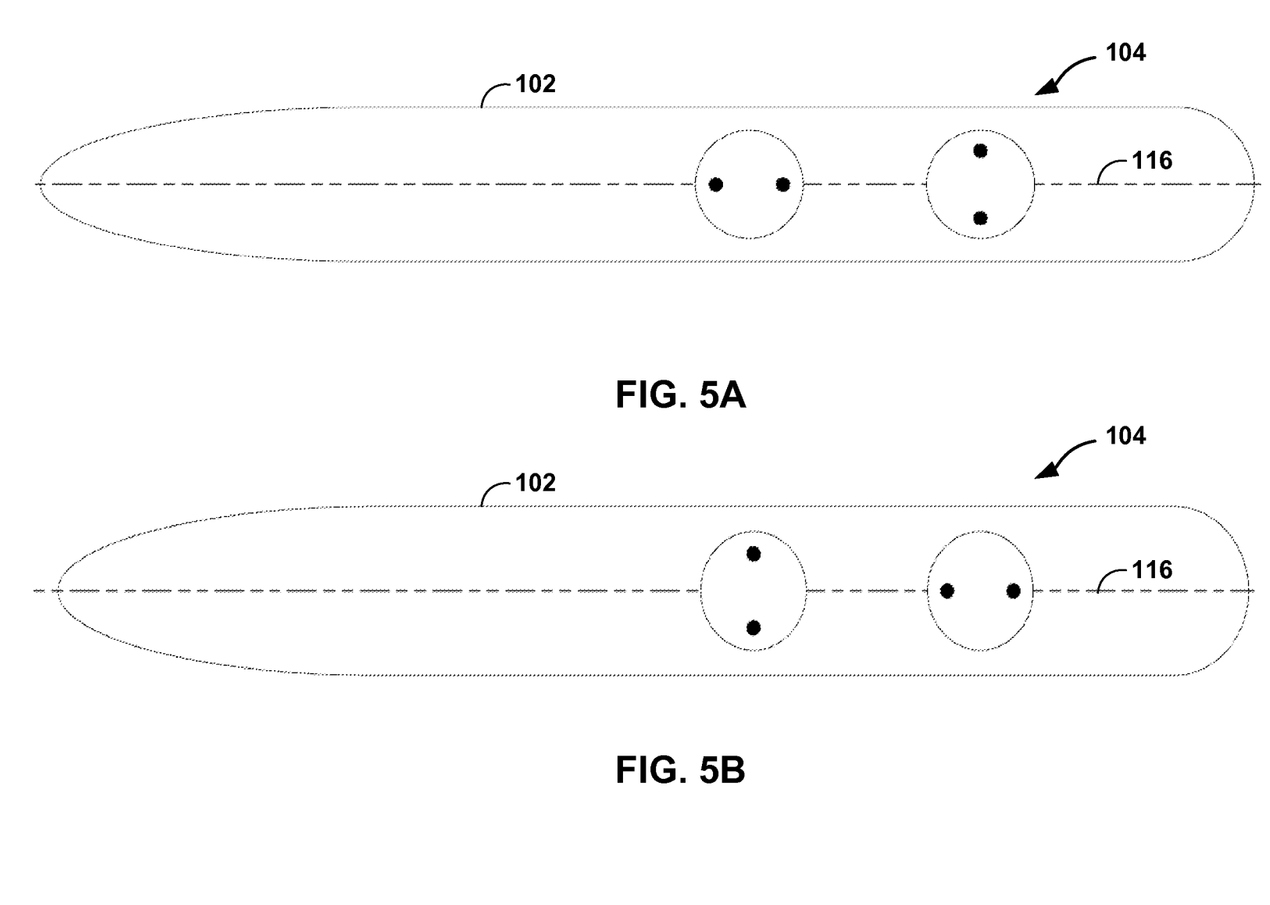
FIGS. 5A-5D are conceptual diagrams each illustrating examples of two, two-element TCAS antennas on an aircraft in different orientations relative to an aircraft centerline.

In the example of FIG. 5A, a pair of two-element TCAS antennas 104 are orthogonal to each other and located either on the top or the bottom of aircraft 102. A first two-element TCAS antenna (i.e., the antenna mounted further to the right of aircraft 102) of two-element TCAS antennas 104 is substantially perpendicular relative to aircraft centerline 116, and a second two-element TCAS antenna of two-element TCAS antennas 104 is substantially parallel relative to aircraft centerline 116. The orientation of each of the pair of two-element TCAS antennas 104 may be one of the four orientations discussed above in FIG. 4.

In the example of FIG. 5B, a pair of two-element TCAS antennas 104 are orthogonal to each other and located either on the top or the bottom of aircraft 102. In this example, a first two-element TCAS antenna (i.e., the antenna mounted further to the right of aircraft 102) of two-element TCAS antennas 104 is substantially parallel relative to aircraft centerline 116, and a second two-element TCAS antenna of two-element TCAS antennas 104 is substantially perpendicular relative to aircraft centerline 116. In some examples, the orientation of each of the pair of two-element TCAS antennas 104 may be one of the four orientations discussed above in FIG. 4.

Figure 5C:
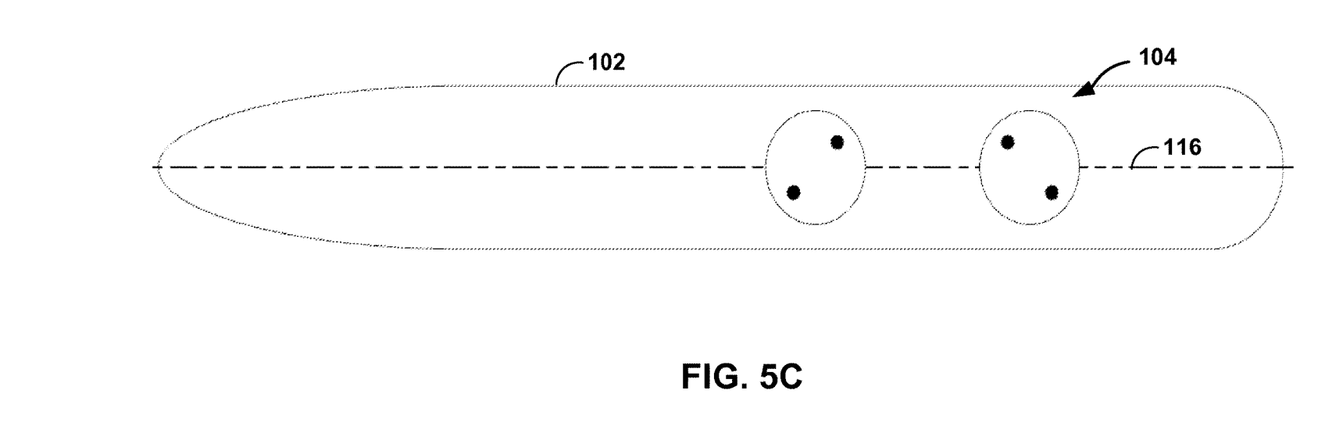

In the example of FIG. 5C, a pair of two-element TCAS antennas 104 are orthogonal to each other and located either on the top or the bottom of aircraft 102. In this example, a first two-element TCAS antenna (i.e., the antenna mounted further to the right of aircraft 102) of two-element TCAS antennas 104 is at a 135 degree offset relative to a portion of aircraft centerline 116, and a second two-element TCAS antenna (i.e., the antenna mounted further to the left of aircraft 102) of two-element TCAS antennas 104 is at a 45 degree relative to a portion of aircraft centerline 116. In some examples, the orientation of each of the pair of two-element TCAS antennas 104 may be one of the four orientations discussed above in FIG. 4.

Figure 5D:
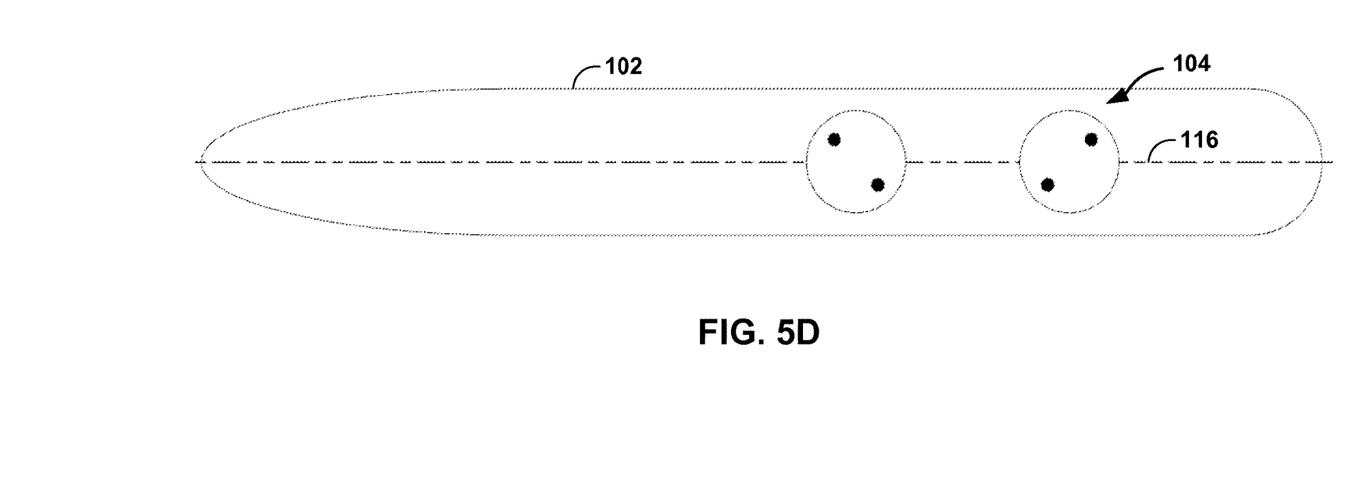

In the example of FIG. 5D, a pair of two-element TCAS antennas 104 are orthogonal to each other and located either on the top or the bottom of aircraft 102. In this example, a first two-element TCAS antenna (i.e., the antenna mounted further to the right of aircraft 102) of two-element TCAS antennas 104 is at a 45 degree offset relative to a portion of aircraft centerline 116, and a second two-element TCAS antenna (i.e., the antenna mounted further to the left of aircraft 102) of two-element TCAS antennas 104 is at a 135 degree offset relative to a portion of aircraft centerline 116. In some examples, the orientation of each of the pair of two-element TCAS antennas 104 may be one of the four orientations discussed above in FIG. 4.

Figure 6A:
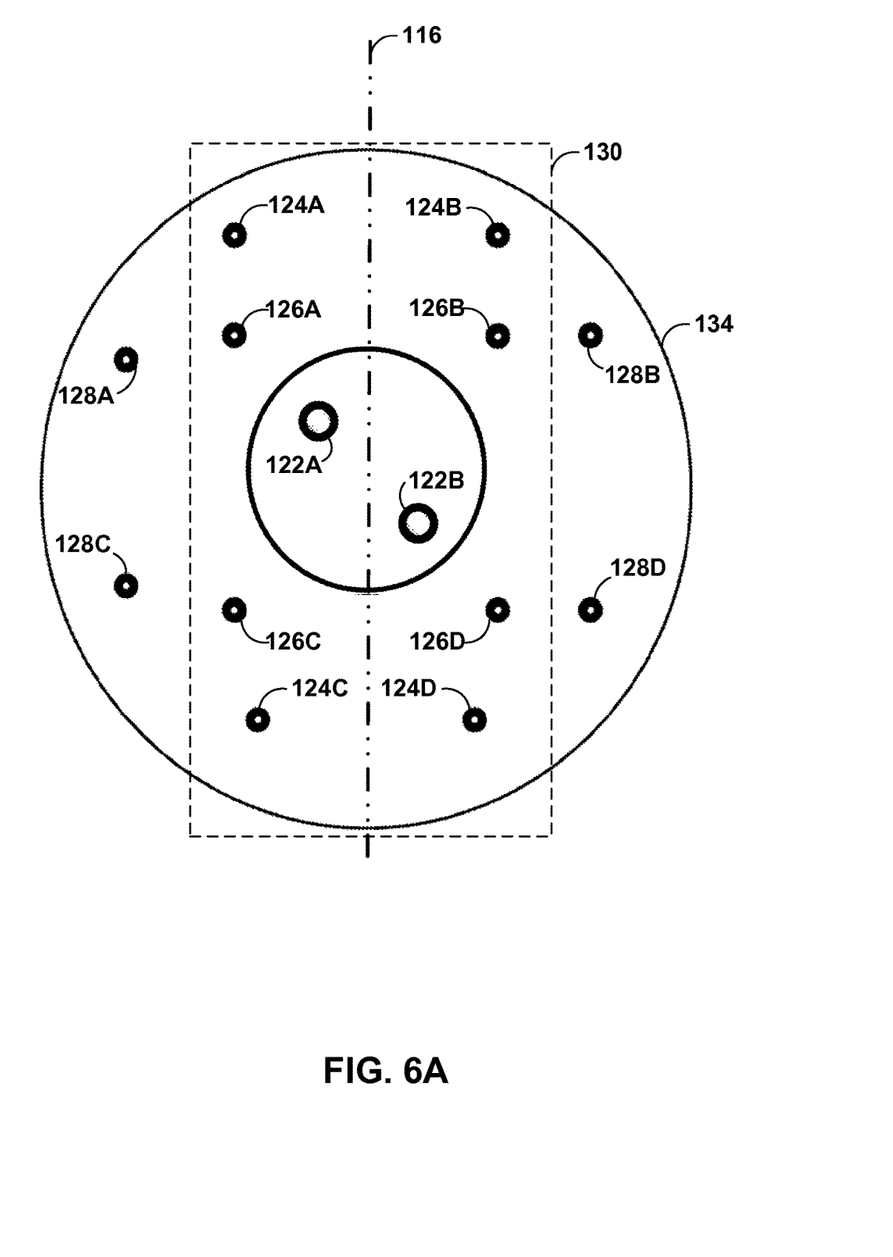
FIGS. 6A and 6B are conceptual diagrams illustrating an example two-element TCAS antenna which has a bolt-hole configuration formed by bolt holes.
Figure 6B:
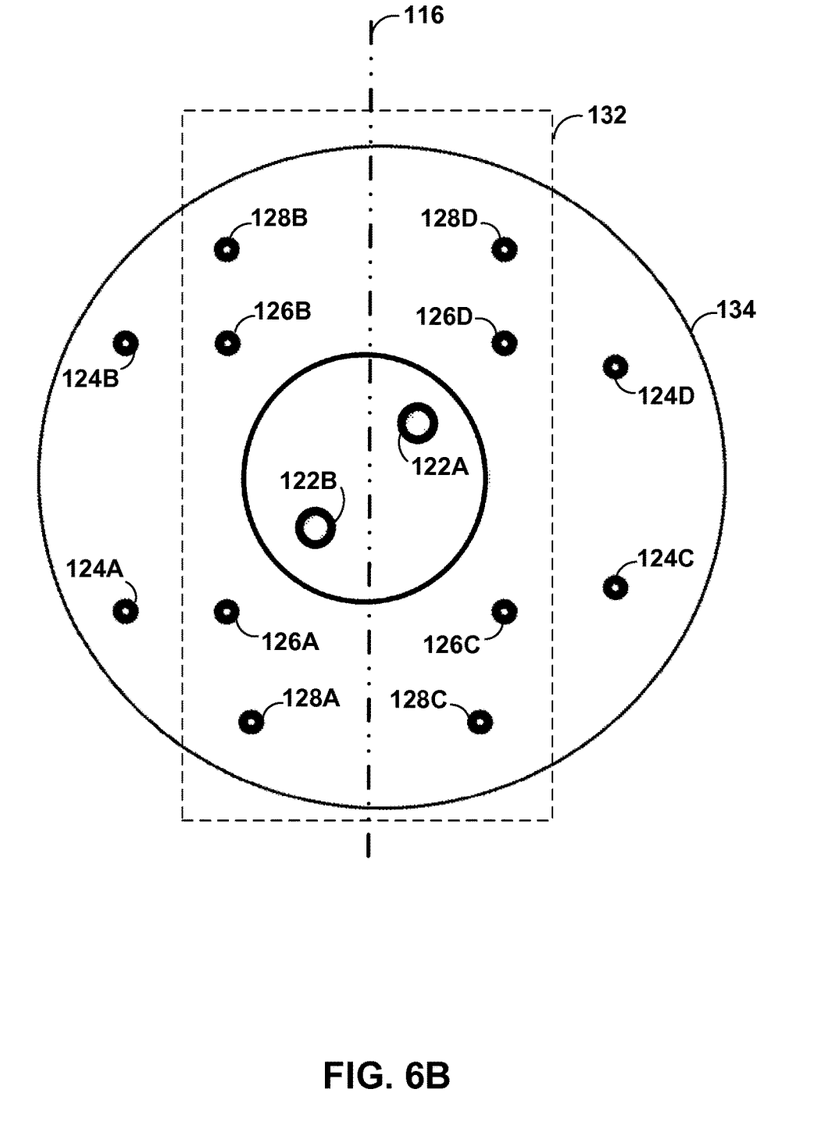

FIGS. 6A and 6B are conceptual diagrams illustrating example two-element TCAS antenna 134 which has bolt-hole configuration formed by bolt holes 124A-124D, 126A-126D, and 128A-128D. In the examples of FIGS. 6A and 6B, two-element TCAS antenna 134 may correspond to both two-element TCAS antenna 4A and 4B as described in FIGS. 1-2B and two-element TCAS antennas 104 as described in FIG. 4. In the example of FIGS. 6A and 6B, two-element TCAS antenna 134 includes antenna elements 122A and 122B (collectively "antenna elements 122") and a bolt-hole configuration formed by bolt holes 124A-124D, 126A-126D, and 128A-128D. FIGS. 6A and 6B show an example aircraft centerline 116, which may, for example, represent the longer dimension (e.g. the front to back dimension) of an aircraft fuselage. As will be explained in greater detail below, the bolt-hole configuration of TCAS antenna 134 may enable TCAS antenna 134 to be mounted to an aircraft in either of a first orientation or a second orientation relative to aircraft centerline 116. Additionally, the bolt-hole configuration may prevent TCAS antenna 134 from being mounted in orientations other than the first orientation or the second orientation.

In the example of FIG. 6A, section 130 identifies first bolt holes 124 and second bolt holes 126 which may be used when attaching two-element TCAS antenna 134 in a first orientation. In other words, first bolt holes 124 and second bolt holes 126 of section 130 are used to attach two-element TCAS antenna 134, so that an axis defined by antenna elements 122 is a 45 degree offset (e.g. a first orientation) relative to a portion of aircraft center line 116. First bolt holes 124 and second bolt holes 126 of section 130 form a pattern that matches a standardized pattern, such as the pattern specified in the ARINC 735 family of standards. When attaching TCAS antenna 134 in the first orientation, third bolt holes 128 of the bolt-hole configuration may not correspond to the standardized pattern and may not be used.

In some examples, the pattern formed by first bolt holes 124 and second bolt holes 126 may not be symmetrical, such that two-element TCAS antenna 134 may only be attached to the aircraft in the first orientation. In other words, although the pattern is symmetrical along a longitudinal axis (e.g., aircraft centerline 116), the pattern is asymmetrical along a latitudinal axis (e.g., an axis perpendicular to aircraft centerline 116), which allows two-element TCAS antenna 134 to only be attached in the first orientation and not in an orientation 180 degrees offset from the first orientation.

In the example of FIG. 6B, the bolt holes of section 132 (i.e., second bolt holes 126 and third bolt holes 128) are used when attaching two-element TCAS antenna 134 in a second orientation. The second orientation may, for example, be offset by 90 degrees from the first orientation described with respect to FIG. 6A. In other words, second bolt holes 126 and third bolt holes 128 of section 132 are used to attach two-element TCAS antenna 134, so that an axis defined by antenna elements 122 is a 135 degree offset relative to a portion of aircraft center line 116. Second bolt holes 126 and third bolt holes 128 of section 132 form a pattern, which may be a standardized pattern, such as the pattern specified in the ARINC 735 family of standards. In the second orientation, first bolt holes 124 of the bolt-hole configuration may not correspond to the pattern and may not be used for mounting TCAS antenna 134 in the second orientation.

In some examples, the pattern formed by second bolt holes 126 and third bolt holes 128 may not be symmetrical, such that two-element TCAS antenna 134 may only be attached to the aircraft in the second orientation. In other words, although the pattern is symmetrical along a longitudinal axis (e.g., aircraft centerline 116), the pattern is asymmetrical along a latitudinal axis (e.g., an axis perpendicular to aircraft centerline 116), which allows two-element TCAS antenna 134 to only be attached in the second orientation and not in an orientation 180 degrees offset from the second orientation.

In some examples, two-element TCAS antenna 134 may have two asymmetrical patterns to enable two-element TCAS antenna 134 to be attached to an aircraft in either a first orientation or a second orientation. In some examples, the two asymmetrical patterns may further prevent two-element TCAS antenna 134 from being attached to aircraft 102 in orientations other than the first orientation or the second orientation.

Various illustrative aspects of the disclosure are described above. These and other aspects are within the scope of the following claims.

What is claimed is:

1. A Traffic Collision Avoidance System (TCAS) antenna comprising:
   two antenna elements;
   a first plurality of bolt holes;
   a second plurality of bolt holes, wherein the first plurality of bolt holes in conjunction with the second plurality of bolt holes form a first asymmetrical pattern that enables the TCAS antenna to be mounted to an aircraft in only a first orientation that is asymmetrical around a first axis defined by the two antenna elements; and
   a third plurality of bolt holes, wherein the third plurality of bolt holes in conjunction with the first plurality of bolt holes form a second asymmetrical pattern that enable the TCAS antenna to be mounted to the aircraft in only a second orientation that is asymmetrical around a second axis perpendicular to the axis defined by the two antenna elements, wherein the second orientation is different than and substantially perpendicular to the first orientation.

2. The TCAS antenna of claim 1, wherein the first asymmetrical pattern matches a pattern of an Aeronautical Radio, Incorporated (ARINC) 735 standard.

3. The TCAS antenna of claim 1, wherein an axis defined by the two antenna elements is perpendicular to a longitudinal axis of the first pattern.

4. The TCAS antenna of claim 1, wherein the second asymmetrical pattern matches a pattern of an Aeronautical Radio, Incorporated (ARINC) 735 standard.

5. The TCAS antenna of claim 1, wherein an axis defined by the two antenna elements is parallel to a longitudinal axis of the second asymmetrical pattern.

6. The TCAS antenna of claim 1, wherein the second asymmetrical pattern is offset by approximately 90 degrees from the first asymmetrical first pattern.

7. A Traffic Collision Avoidance system (TCAS) comprising:
   a processing device on an aircraft;
   a display device on the aircraft; and
   two TCAS antennas, wherein each TCAS antenna comprises:
      two antenna elements;
      a first plurality of bolt holes;
      a second plurality of bolt holes, wherein the first plurality of bolt holes in conjunction with the second plurality of bolt holes form a first asymmetrical pattern that enables the TCAS antenna to be mounted to an aircraft in only a first orientation that is asymmetrical around a first axis defined by the two antenna elements; and
      a third plurality of bolt holes, wherein the third plurality of bolt holes in conjunction with the first plurality of bolt holes form a second asymmetrical pattern that enable the TCAS antenna to be mounted to the aircraft in only a second orientation that is asymmetrical around a second axis perpendicular to the axis defined by the two antenna elements, wherein the second orientation is different than and substantially perpendicular to the first orientation,
   wherein a first TCAS antenna of the two TCAS antennas is mounted to the aircraft in the first orientation and a second TCAS antenna of the two TCAS antennas is mounted to the aircraft in the second orientation.

8. The system of claim 7, wherein a first TCAS antenna of the two TCAS antennas is configured to be interchangeable with a second TCAS antenna of the two TCAS antennas.

9. The system of claim 8, wherein each of the two TCAS antennas are configured to be mounted to one of a top of the aircraft or a bottom of the aircraft.

10. The system of claim 7, wherein a first TCAS antenna of the two TCAS antennas is mounted to the aircraft in the first orientation and a second TCAS antenna of the two TCAS antennas is mounted to the aircraft in the second orientation comprises the first TCAS antenna mounted to the top of the aircraft and offset by approximately 90 degrees from the second TCAS antenna mounted to the bottom of the aircraft.

11. The system of claim 7, wherein the first asymmetrical pattern matches a pattern of an Aeronautical Radio, Incorporated (ARINC) 735 standard.

12. The system of claim 7, wherein an axis defined by the two antenna elements is one of perpendicular or parallel to a longitudinal axis of the first asymmetrical pattern.

13. The system of claim 7, wherein the second asymmetrical pattern matches a pattern of an ARINC 735 standard.

14. A system comprising:
a display device on an aircraft;
two or more Traffic Collision Avoidance systems (TCAS),
wherein each TCAS comprises:
a processing device on the aircraft; and
two TCAS antennas, wherein each TCAS antenna comprises:
two antenna elements;
a first plurality of bolt holes;
a second plurality of bolt holes, wherein the first plurality of bolt holes in conjunction with the second plurality of bolt holes form a first asymmetrical pattern that enables the TCAS antenna to be mounted to an aircraft in only a first orientation that is asymmetrical around a first axis defined by the two antenna elements; and
a third plurality of bolt holes, wherein the third plurality of bolt holes in conjunction with the first plurality of bolt holes form a second asymmetrical pattern that enable the TCAS antenna to be mounted to the aircraft in only a second orientation that is asymmetrical around a second axis perpendicular to the axis defined by the two antenna elements, wherein the second orientation is different than and substantially perpendicular to the first orientation,
wherein a first TCAS antenna of the two TCAS antennas is mounted to the aircraft in the first orientation and a second TCAS antenna of the two TCAS antennas is mounted to the aircraft in the second orientation.

* * * * *